United States Patent [19]

Thomas

[11] 4,270,766

[45] Jun. 2, 1981

[54] ARM AND LEG POWERED DRIVE SYSTEM FOR A VEHICLE

[76] Inventor: John C. Thomas, 1557 McKinley St., Eugene, Oreg. 97402

[21] Appl. No.: 65,458

[22] Filed: Aug. 10, 1979

[51] Int. Cl.³ .............................................. B62M 1/12
[52] U.S. Cl. .................................. 280/234; 280/236; 280/250
[58] Field of Search ............... 280/233, 234, 236, 238, 280/249, 250

[56] References Cited

U.S. PATENT DOCUMENTS

| | | | |
|---|---|---|---|
| 2,390,719 | 12/1945 | Kurth | 280/234 |
| 2,533,728 | 12/1950 | Gedat et al. | 280/233 |
| 3,193,305 | 7/1965 | Hendricks | 280/250 |
| 3,910,599 | 10/1975 | Thomas | 280/234 |

Primary Examiner—John J. Love
Assistant Examiner—Donn McGiehan
Attorney, Agent, or Firm—James D. Givnan, Jr

[57] ABSTRACT

A drive system for an operator powered vehicle utilizing both arm and leg power. Leg power drives an axle carried sprocket coupled to a torque tube via a roller chain. A hand crank is powered by arm motion and is coupled to a concentric torque tube by a unidirectional clutch. Rotary motion is accordingly imparted to the torque tube by the arms or legs, jointly or individually, which motion is transmitted to a wheel hub via a roller chain and sprocket arrangement. A chain shifter provides a variable speed power transmission between said torque tube and the wheel hub. Brake cable actuating members on the wheel axle and the hand crank permit selective tensioning of brake cables actuating front and rear wheel brakes. A modified form of the invention dispenses with the torque tube. Driving and driven sprockets of a hand crank assembly are fixedly mounted on a hand crank.

10 Claims, 3 Drawing Figures

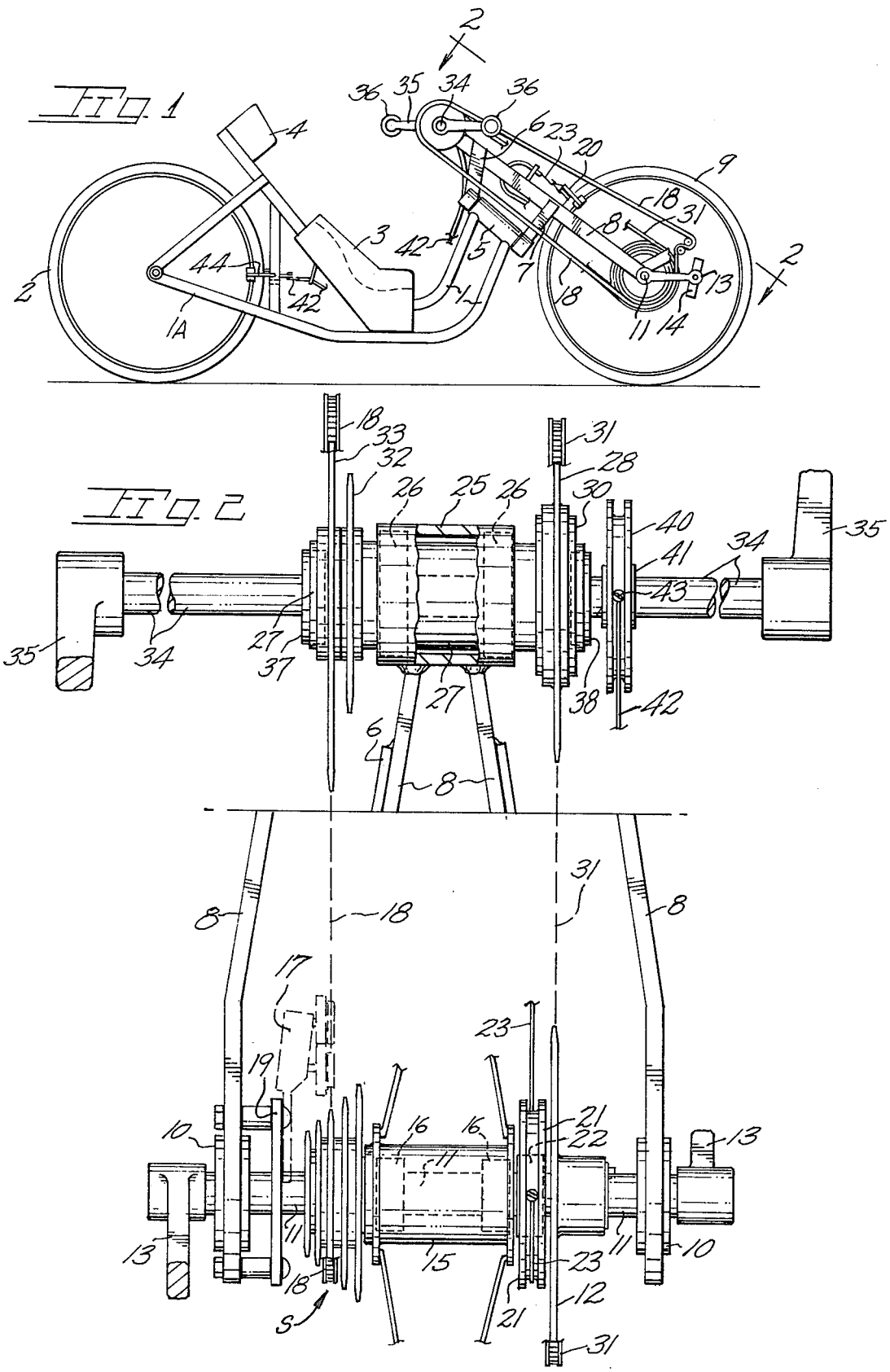

ARM AND LEG POWERED DRIVE SYSTEM FOR A VEHICLE

BACKGROUND OF THE INVENTION

The present invention relates generally to a vehicle drive system utilizing both arm and leg power of the operator and applying power to a vehicle drive wheel.

The present drive system is similar to some extent to the vehicle drive system disclosed in U.S. Pat. No. 3,910,599 issued Oct. 7, 1975 to the present inventor.

By way of background it is admittedly old to utilize both arm and leg power to drive a vehicle as per U.S. Pat. Nos. 329,755; 376,241; 2,004,683; 2,390,719; 2,533,728; 3,193,305; 3,823,959; British Patents Nos. 426,044; 515,317; French Patent No. 743,559 and other patents.

The above mentioned U.S. patent of the present inventor discloses a drive system advance for solving of problems encountered by the prior art. The present drive system constitutes an improvement thereover and over other known prior art systems by reason of simplification rendering a savings in cost, number of components and vehicle weight.

SUMMARY OF THE PRESENT INVENTION

The present invention concerns a drive system for an operator powered vehicle permitting the operator to utilize either the legs or the arms or a combination thereof to power the vehicle.

A vehicle drive wheel is mounted on a powered hub which, in turn, is journalled on a live axle. An axle mounted sprocket is in driving roller chain entrainment with a torque tube mounted sprocket. Additional torque tube mounted sprockets serve to transmit tube torque to the wheel mounted hub assembly to drive same. Arm power may be optionally applied to the torque tube by means of a hand powered crank journalled concentric with the torque tube and engaged therewith by unidirectional clutch means. Hand crank rotation in one direction accordingly contributes torque to the torque tube. Non-use of the arms results in overrunning of unidirectional clutch components. A simplified form of the invention dispenses with the torque tube and unidirectional clutches thereon and instead utilizes sprockets, driving and driven, fixed to a hand powered crankshaft.

Important objects of the invention include the provision of a leg and arm powered drive system for vehicles including an arm powered crankshaft engageable with a torque tube the latter coupled to a driving wheel of the vehicle; the provision of a drive system for a vehicle permitting the use of arm and leg power, individually or combined, to drive a powered vehicle wheel the system using a minimum of components for cost and weight savings with increased durability and which system permits the handgrips and pedals to be closely disposed to one another for convenient operation by a child.

BRIEF DESCRIPTION OF THE DRAWING

In the accompanying drawing:

FIG. 1 is a side elevational view of a vehicle equipped with the present drive system;

FIG. 2 is a view taken along line 2—2 of FIG. 1 and sectioned for purposes of illustration.

DETAILED DESCRIPTION OF THE PREFERRED EMBODIMENT

Figure 3:
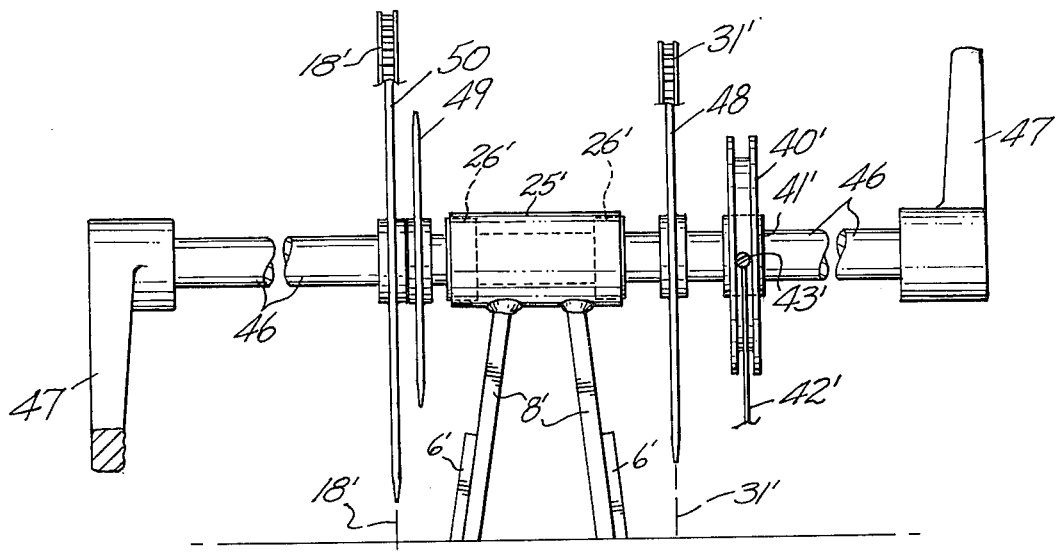
FIG. 3 is a view similar to FIG. 2 but showing a modified form of the invention.

With continuing attention to the drawing wherein applied reference numerals indicate parts similarly hereinafter identified, the reference numeral 1 indicates a frame of the vehicle which is of a lightweight nature and extending rearwardly at 1A to support a rear wheel 2 or wheels if the vehicle is of tricycle configuration. Secured to frame 1 by suitable means is a contoured seat 3 and a backrest 4 to permit the operator to be in a semiprone position.

A head tube 5 is carried at the frame forward end and swingably supports upper and lower pairs of fork arm components 6 and 7 which terminate forwardly in supporting securement to a fork structure 8 carrying a front wheel 9.

At the lower end of fork 8 are bearings 10 (FIG. 2) receiving an axle 11 fitted with sprocket 12. Pedal arms 13 carry pedals 14 (FIG. 1) enabling imparting of leg power to axle 11 and sprocket 12 affixed thereon.

A wheel hub 15 is suitably journalled by bearings 16 on axle 11. Hub 15 may be of a conventional overrunning type having a cluster of different size sprockets S providing a variable reduction drive for hub and associated wheel. Power transmission means preferably includes a derailleur type chain shifter at 17 shown in outline in broken lines and includes a pair of laterally shiftable sprockets through which a sprocket entrained roller chain 18 passes. A manual control cable acts against spring biasing means of the derailleur shifter to align chain 18 with the desired sprocket of the cluster all in the conventional manner. A fork mounted bracket at 19 carries the chain shifting device. While a speed changing hub is disclosed it is to be understood that the present drive system is also practical with but a single speed hub and sprocket arrangement.

For actuating a front wheel caliper brake 20 of the vehicle I provide a brake actuating member 21 carried on axle 11 by a unidirectional clutch 22. For braking, counterclockwise rotation of axle 11 as viewed from the left hand side of FIG. 2 accordingly causes clutch engagement and thereafter a brake cable at 23 to be tensioned. Normal or clockwise rotation of axle 11 results in clutch components overriding one another and brake actuating member 21 remaining fixed. The above description of the vehicle axle, hub and brake components is by way of completeness only and does not constitute a novel combination per se in view of same being essentially disclosed in the present inventor's above noted earlier U.S. patent.

In place on the fork structure is a bearing housing 25 within which are suitably secured bearings 26. Said bearings journal a torque assembly within the housing which includes a torque tube 27 for retention within the inner races of said bearings. The torque tube assembly includes a tube drive sprocket at 28 coupled to the tube by unidirectional roller clutch 30. A roller chain 31 transmits power from the leg powered lower sprocket 12 to sprocket 28 termed a tube drive sprocket. Secured to the opposite end of torque tube 27 are driven sprockets 32 and 33 for entrainment with roller chain 18. A derailleur type chain shifter (not shown) shifts chain 18 laterally subjacent sprockets 32 and 33 to provide a selection of ten speeds when considered with the sprocket selection afforded by the lower derailleur shifter earlier described.

The torque tube assembly includes a hand crankshaft 34 provided with end mounted hand cranks 35 suitably fitted with handgrips 36. A mid segment of the hand crank is concentrically supported within the torque tube by unidirectional roller clutch bearings at 37 and 38 which permit the application of hand crank torque (clockwise direction as viewed from the left hand side of FIG. 2) to the torque tube or alternatively tube rotation about a static hand crankshaft as when the vehicle is powered entirely by leg power.

A brake actuating member at 40, in similarity to the axle mounted brake member earlier described is carried by a unidirectional roller clutch bearing at 41 and is adapted for counterclockwise movement (as viewed above) in response to like movement of hand crankshaft 34 to tension a brake cable 42 secured by a fastener 43 to said brake member. Cable 42 is suitably housed and supported by frame mounted brackets and terminates at a rear wheel caliper brake assembly 44.

In operation, rotational movement to axle 11 by the operator's legs will drive axle mounted sprocket 12 and torque tube driving sprocket 28 via roller chain 31. Sprockets 32 or 33 on the torque tube will drive via roller chain 18, a sprocket of the cluster driving wheel hub 15. Cessation of leg motion with continued vehicle travel is possible by unidirectional clutch 30 which may overrun in such an instance.

Arm power is transmitted to the torque tube by means of unidirectional clutches 37-38 which conversely permit overrunning of the torque tube relative a static hand crankshaft. Accordingly, the vehicle may be powered by leg motion or by arm motion or a combination thereof. Further, the novel arrangement permits vehicle movement, as for example when coasting down an incline, with the legs and arms of the operator remaining immobile. The operation of the brake systems is believed apparent from their above descriptions.

A suitable roller clutch bearing for incorporation into the present drive system is that manufactured by the Torrington Company and termed a roller clutch bearing with the following identification—TORR. RCB-121616.

The drive system may dispense with sprocket 32 or sprocket 33 as well as the sprocket cluster and substitute for the cluster a single sprocket to provide a single speed vehicle. Also roller clutch bearing 30 may be dispensed with.

In FIG. 3 a modified form of the invention is disclosed which dispenses with the above described torque tube and associated clutches and instead utilizes a hand crank assembly having sprockets affixed directly to a hand crank. This modification is intended for use on vehicles such as tricycles and training bicycles normally ridden at slower speeds.

Structure corresponding to that described in conjunction with the first described form of the invention is identified by like prime reference numerals. As the lower fork structure and components carried thereby is as shown in FIG. 2, the same is not again shown in FIG. 3.

An upper segment of the fork is at 8' supported by upper fork arm components 6'. In place on fork 8' is a bearing housing 25' within which are secured bearings 26'.

A hand crank assembly includes a hand crankshaft 46 having a central segment journalled within bearings 26'. Hand cranks at 47 permit the application of arm power to shaft 46 and to a sprocket 48 thereon, termed a hand crankshaft driving sprocket. Hand crankshaft driven sprockets are at 49 and 50. Accordingly, arm power may be imparted directly to hand crankshaft 46 with such power supplemented, if desired, by leg power transmitted to crankshaft driving sprocket 48 by a roller chain 31' constituting coupling means. A roller chain 18' is entrained about sprocket 50 to provide power transmission means between the sprocket and the hub sprocket or sprockets on live front axle 11.

A brake actuating member at 40' is carried by a unidirectional roller clutch bearing 41' and is adapted for clockwise movement (as viewed from the right hand side of FIG. 3) in response to like movement of hand crankshaft 46 to tension a brake cable 42' secured by a fastener 43' to said brake member and oppositely terminating at a brake assembly of the vehicle.

The operation of the modified form of the invention is as above described for the first described form of the invention but with coincident rotation at all times of wheel carrying axle 11 and hand crankshaft 46 assuming leg or arm power is being applied. The application of leg or arm power or joint use of such power remains optional as, for example, when the vehicle is coasting. Braking by partial rotation of brake actuating member 40' may be by leg power via shaft or axle 11, sprocket 12, roller chain 31, sprocket 48 and hand crankshaft 46.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A drive system for a vehicle enabling use of an operator's arms and legs to provide a source of motive power, jointly or individually, to a powered vehicle wheel, said system comprising, a live axle and sprocket combination adapted for rotation by the operator's legs, a hub and wheel rotatably journaled on said axle, a hand crankshaft adapted for rotation by the operator's arms, a torque tube assembly including a torque tube concentric with said hand crankshaft and having driving and driven sprockets thereon, unidirectional clutch means interposed between said torque tube and said hand crankshaft and having clutch components engageable during rotation of said hand crankshaft in one direction and thereby operable to impart powered rotation to the torque tube while permitting an overrunning of clutch components in an opposite direction of rotation, means directly coupling the live axle and sprocket combination to the torque tube driving sprocket, and power transmission means interconnecting a torque tube driven sprocket and said axle journaled hub to impart rotation to same.

2. The invention claimed in claim 1 including additional unidirectional clutch means interposed between said torque tube driving sprocket and said torque tube.

3. The invention claimed in claim 1 wherein said torque tube assembly includes multiple driven sprockets, said hub having a sprocket cluster thereon, said power transmission means including a roller chain, means entrained with said roller chain and operable to control roller chain engagement with a sprocket of said sprocket cluster and a driven sprocket of said torque tube assembly.

4. The invention claimed in claim 1 additionally including a wheel fork structure including a bearing housing within which said torque tube is journalled.

5. The invention claimed in claim 1 additionally including a brake actuating member, a unidirectional clutch interposed between said brake actuating member and said live axle and operable to reposition the brake actuating member upon axle rotation in one direction.

6. The invention claimed in claim 5 additionally including a second brake actuating member and a second unidirectional clutch interposed between said second brake actuating member and said hand crankshaft and operable to reposition the second brake actuating member upon hand crank rotation in one direction.

7. A drive system for a vehicle enabling use of an operator's arms and legs to provide a source of motive power, jointly or individually, to a powered vehicle wheel, said system comprising,
- a live axle and sprocket combination adapted for rotation by the operator's legs,
- a hub and wheel rotatably journalled on said axle,
- a hand crank assembly adapted for rotation by the operator's arms and including a hand crankshaft, a hand crankshaft driving sprocket and a hand crankshaft driven sprocket,
- means directly coupling the live axle and sprocket combination to the driving sprocket of said hand crank assembly, and
- power transmission means interconnecting the hand crank driven sprocket to said axle journalled hub to impart rotation to same and the wheel thereon.

8. The invention claimed in claim 8 wherein said hand crank assembly includes multiple driven sprockets, said hub having a sprocket cluster thereon, said power transmission means including a roller chain, means entrained with said roller chain and operable to control roller chain engagement with a sprocket of said sprocket cluster and a driven sprocket of said hand crank assembly.

9. The invention claimed in claim 8 additionally including a wheel fork structure including a bearing housing within which said hand crank assembly is journalled.

10. The invention claimed in claim 8 additionally including a brake actuating member, a unidirectional clutch interposed between said brake actuating member and said hand crankshaft and operable to reposition the brake actuating member upon hand crankshaft rotation in one direction.

* * * * *